United States Patent
Wei et al.

(10) Patent No.: US 9,797,714 B2
(45) Date of Patent: Oct. 24, 2017

(54) LIMIT DETECTION SYSTEM FOR RAILWAY VEHICLE

(71) Applicant: CRRC QINGDAO SIFANG CO., LTD., Qingdao, Shandong (CN)

(72) Inventors: Jingli Wei, Shandong (CN); Zhiwei Liu, Shandong (CN); Fangling Cheng, Shandong (CN); Xinfang Miao, Shandong (CN); Duling Sun, Shandong (CN); Feng Li, Shandong (CN); Zhe Wu, Shandong (CN); Mingjuan Ge, Shandong (CN); Song Zhang, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/119,991

(22) PCT Filed: Oct. 28, 2015

(86) PCT No.: PCT/CN2015/093028
§ 371 (c)(1),
(2) Date: Aug. 18, 2016

(87) PCT Pub. No.: WO2016/078502
PCT Pub. Date: May 26, 2016

(65) Prior Publication Data
US 2017/0067733 A1    Mar. 9, 2017

(30) Foreign Application Priority Data
Nov. 20, 2014    (CN) .......................... 2014 1 0668858

(51) Int. Cl.
*G01B 11/24*  (2006.01)
*G01M 17/08*  (2006.01)
(Continued)

(52) U.S. Cl.
CPC ................ *G01B 11/24* (2013.01); *B61K 9/00* (2013.01); *G01B 11/245* (2013.01); *G01B 11/25* (2013.01); *G01M 17/08* (2013.01)

(58) Field of Classification Search
CPC ....... G01B 11/24; G01B 11/25; G01B 11/306; G01B 11/245; G06T 7/0057
(Continued)

(56) References Cited

U.S. PATENT DOCUMENTS 3,609,676 A * 9/1971 Jauquet .................. B61L 3/225
246/187 B
4,949,816 A * 8/1990 Brown ...................... B66F 9/08
187/227
(Continued)

FOREIGN PATENT DOCUMENTS

CN    2043954 U    9/1989
CN    2494780 Y    6/2002
(Continued)

OTHER PUBLICATIONS

International Search Report for PCT/CN2015/093028, dated Feb. 4, 2016, ISA/CN.
(Continued)

*Primary Examiner* — Tarifur Chowdhury
*Assistant Examiner* — Md M Rahman
(74) *Attorney, Agent, or Firm* — Yue Xu; U.S. Fairsky LLP

(57) ABSTRACT

A clearance detection system for a railway vehicle includes a cross beam, an upright column connected to two ends of the cross beam through an adjusting block, an inclined support connected to the upright column and the cross beam for supporting the upright column and the cross beam, an electric cylinder arranged on the upright column and the cross beam, a telescopic guide rod being provided on a guide rail of the electric cylinder, a connecting plate fixed at an end
(Continued)

of the telescopic guide rod, and a PC connected to a controller of the electric-cylinder. The telescopic guide rod is movable along the guide rail of the electric-cylinder under movement of the electric-cylinder, adjusts the position of the industrial camera, and detects the contours of different types of rail vehicles.

8 Claims, 3 Drawing Sheets

(51) Int. Cl.
    *G01B 11/25*     (2006.01)
    *B61K 9/00*     (2006.01)
    *G01B 11/245*     (2006.01)

(58) Field of Classification Search
    USPC .......................................................... 356/601
    See application file for complete search history.

(56) References Cited

U.S. PATENT DOCUMENTS 5,680,054 A * 10/1997 Gauthier ............... B61L 23/044
    246/121

8,157,218 B2 * 4/2012 Riley ....................... B61L 1/14
    246/122 R

FOREIGN PATENT DOCUMENTS

| | | |
|---|---|---|
| CN | 101907451 A | 12/2010 |
| CN | 201756124 U | 3/2011 |
| CN | 102735174 A | 10/2012 |
| CN | 103043249 A | 4/2013 |
| CN | 203310400 U | 11/2013 |
| CN | 103454694 A | 12/2013 |
| CN | 203432536 U | 2/2014 |
| CN | 203949625 U | 11/2014 |
| CN | 104374335 A | 2/2015 |
| DE | 102012200053 A1 | 7/2012 |
| EP | 1974610 A2 | 10/2008 |
| JP | 2007203413 A | 8/2007 |

OTHER PUBLICATIONS

Summary of the Chinese 2nd Office Action for CN201410668858.5, dated Feb. 15, 2017.

* cited by examiner

LIMIT DETECTION SYSTEM FOR RAILWAY VEHICLE

This application is a National Phase entry of PCT Application No. PCT/CN2015/093028, filed Oct. 28, 2015, which claims the priority to Chinese Patent Application No. 201410668858.5, titled "CLEARANCE DETECTION SYSTEM FOR RAILWAY VEHICLE", filed with the Chinese State Intellectual Property Office on Nov. 20, 2014, the entire disclosures of which are incorporated herein by reference.

FIELD

The present application relates to the field of vehicle detection, and in particular to a rail vehicle clearance detection system.

BACKGROUND

A rail transit clearance not only defines a rail vehicle and a clearance sectional shape, but also defines an equipment installation position and a reserved space, which therefore is one of the basic guarantees for rail transit safe transportation, and a base for designing rail transit. After the entire rail vehicle is assembled, contour size of the rail vehicle should be detected for determining whether the contour size meets the requirement of the vehicle clearance.

In the conventional technology, the dimension of the vehicle is generally detected by a preset template. However, rail vehicles at least include high speed multiple units, a passenger train, a locomotive, an urban rail vehicle, and etc., which have different clearance standards. Thus, different clearance templates should be manufactured for the detection, thereby the detecting process is slowed down.

SUMMARY

An object of the present application is to provide a rail vehicle clearance detecting system, which solves a problem in the conventional technology that different clearance templates have to be manufactured for different types of rail vehicles and thus a detecting process is slowed down.

In order to solve the above problem, a technical solution is provided as follows.

A rail vehicle clearance detecting system includes:

a cross beam;

an upright column connected to two ends of the cross beam via an adjusting block;

an inclined support connected to the cross beam and the upright column for supporting the cross beam and the upright column;

an electric-cylinder arranged on the upright column and the cross beam, wherein a telescopic guide rod is provided on a guide rail of the electric-cylinder and the telescopic guide rod is movable along the guide rail of the electric-cylinders under the movement of the electric-cylinder;

a connecting plate fixed at an end of the telescopic guide rod, wherein a structured light device is provided at one end of the connecting plate and an industrial camera is provided at the other end of the connecting plate, and the industrial camera is used for detecting the contour of the rail vehicle to obtain three-dimensional information of an image of the rail vehicle; and a PC connected to a controller of the electric-cylinder, wherein the PC is used for controlling the electric-cylinder, receiving the three-dimensional information of the image of the rail vehicle sent by the industrial camera, processing the three-dimensional information of the image of the rail vehicle to obtain sectional contour data of the rail vehicle, and performing point cloud registration for the sectional contour data.

Preferably, the cross beam includes a first cross beam and a second cross beam connected to each other via a key.

Preferably, the PC is further used for filtering out invalid data in sectional contour data before performing the point cloud registration for the sectional contour data.

Preferably, that the PC is used for filtering out the invalid data in the sectional contour data includes that the PC is used for filtering out noise data in the sectional contour data.

Preferably, that the PC is used for performing point cloud registration for the sectional contour data includes that the PC is used for comparing the sectional contour data with rail vehicle contour reference data pre-stored in the PC.

Preferably, the PC is further used for displaying a comparison result in a three-dimensional visualization manner and protecting the sectional contour data after comparing the sectional contour data with the rail vehicle contour reference data pre-stored in the PC.

Preferably, the rail vehicle clearance detecting system further includes a laser rangefinder arranged at a side of the rail vehicle clearance detecting system, wherein the laser rangefinder is used for detecting a position of the rail vehicle in a moving direction of the vehicle so as to obtain position information and send the position information to the PC.

Preferably, the PC is an industrial personal computer.

Therefore, the present application has the following beneficial effects.

The rail vehicle clearance detecting system is provided according to the present application. The industrial camera detects the contour of the rail vehicle to obtain the three-dimensional information of the image of the rail vehicle. The PC receives the three-dimensional information of the image of the rail vehicle sent by the industrial camera, processes the three-dimensional information of the images of the rail vehicle so as to obtain the sectional contour data of the rail vehicle, and performs point cloud registration for the sectional contour data. The telescopic guide rod is movable along the guide rail of the electric-cylinder under movement of the electric-cylinder, adjusts the position of the industrial camera, and detects the contours of different types of rail vehicles, which solves the problem in the conventional technology that different clearance templates have to be manufactured according to different types of rail vehicles, causing a slow detecting speed.

BRIEF DESCRIPTION OF THE DRAWINGS

In order to illustrate technical solutions in embodiments of the present application or the conventional technology more clearly, drawings to be used in the description of the embodiments or the conventional technology are introduced simply hereinafter. Apparently, the drawings described below describe only some of the embodiments of the present application. Other drawings may be obtained based on these drawings by those skilled in the art without any creative work.

DETAILED DESCRIPTION

Technical solutions in embodiments of the present application are described clearly and completely in conjunction with drawings in the embodiments of the present application hereinafter. Apparently, the described embodiments are some rather all of the embodiments of the present application. Any other embodiments obtained based on the embodiments of the present application by those skilled in the art without any creative work fall within the scope or protection of the present application.

A rail vehicle clearance detecting system is disclosed according to an embodiment of the present application, which solves a problem in the conventional technology that different clearance templates have to be manufactured according to different types of rail vehicles, causing a slow detecting speed.

The rail vehicle clearance detecting system disclosed by the embodiment of the present application includes a detecting rack in a gantry structure, a detecting device and a PC.

Figure 1:
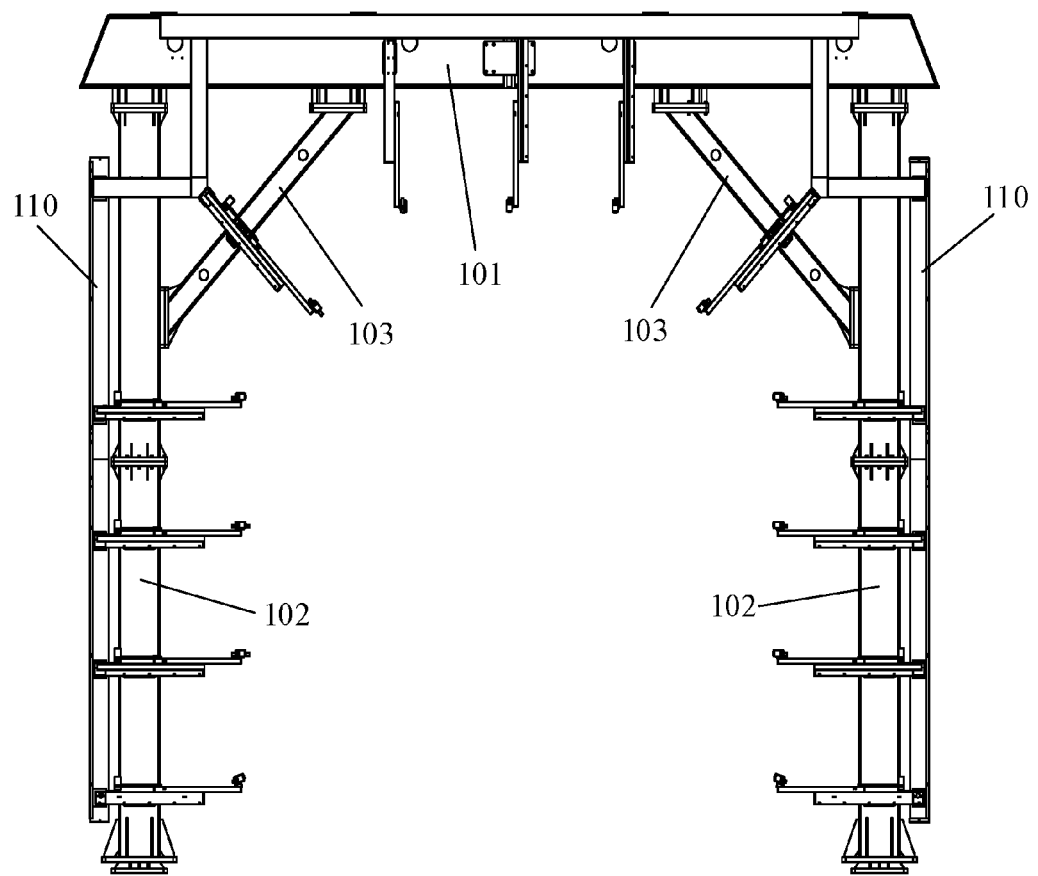
FIG. 1 is a front view of a rail vehicle clearance detecting system according to an embodiment of the present application.
Figure 2:
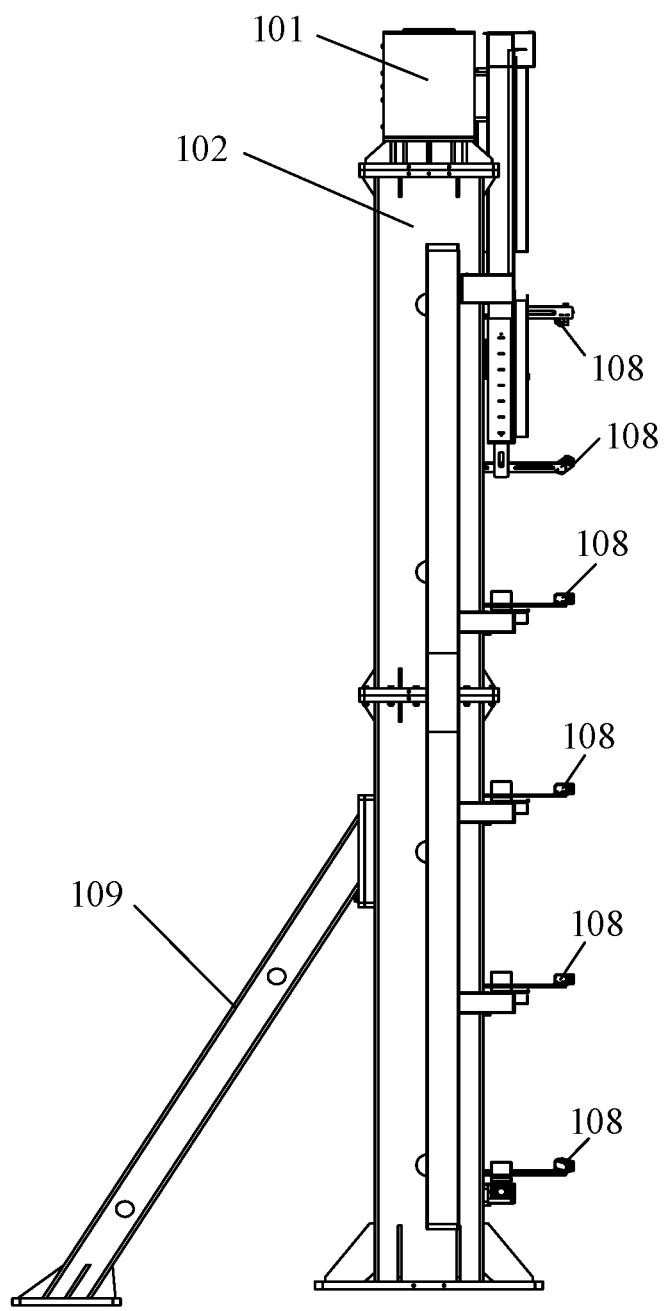
FIG. 2 is a side view of the rail vehicle clearance detecting system according to the embodiment of the present application.

Referring to FIG. 1 and FIG. 2, the detecting rack includes:

a cross beam 101, two upright columns 102, wherein the two upright columns 2 are connected to two ends of the cross beam 101 via an adjusting block respectively, and an inclined support 103 arranged between the cross beam 101 and a corresponding upright column of the two upright columns 102 for supporting the cross beam 101 and the corresponding upright column of the two upright columns 102.

Figure 3:
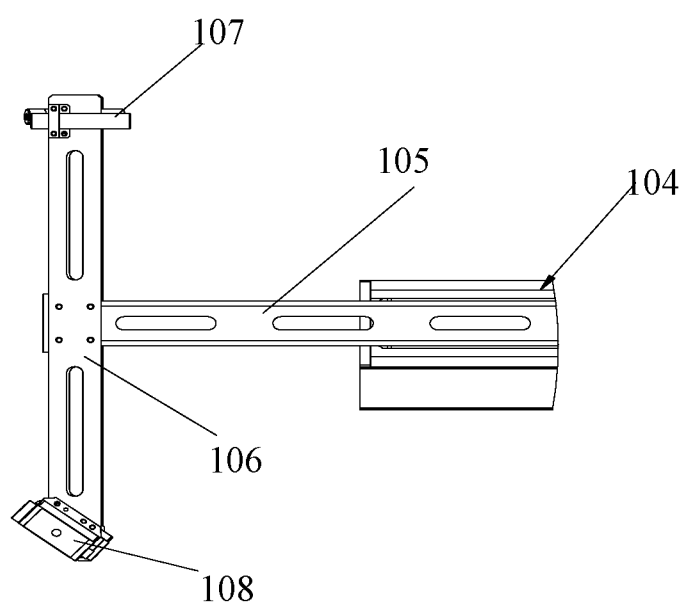
FIG. 3 is schematic structural diagram of a detecting device in the rail vehicle clearance detecting system according to the embodiment of the present application.

Referring to FIG. 2 and FIG. 3, the detecting device includes:

an electric-cylinder 104 arranged on the upright columns 102 and the cross beam 101, wherein a telescopic guide rod 105 is provided on a guide rail of the electric-cylinder 104 and the telescopic guide rod 105 is movable along the guide rail of the electric-cylinder 104 under the movement of the electric-cylinder 104;

a connecting plate 106 fixed at an end of the telescopic guide rod 105, wherein a structured light device 107 is provided at one end of the connecting plate 106 and an industrial camera 108 is provided at the other end of the connecting plate 106, and the industrial camera 108 is used for detecting the contour of the rail vehicle to obtain sectional contour data of the rail vehicle.

Preferably, the structured light device 107 may be a laser bar.

In the embodiment, the PC is connected to a controller of the electric-cylinder 104. When the rail vehicle clearance detection is performed, a vehicle to be detected moves to the detecting rack of the rail vehicle clearance detecting system, and the PC sends a control instruction to the controller of the electric-cylinder 104. The controller of the electric-cylinder 104 controls the electric-cylinder 104 to operate after receiving the control instruction. The telescopic guide rod 105 moves along the guide rail of the electric-cylinder 104 under the movement of the electric-cylinder 104, which may get close to or move far away from the detected vehicle.

It should be noted that, contour reference data for different types of rail vehicles is pre-stored in the PC. When the rail vehicle clearance detection is performed, the PC selects the contour reference data for the vehicle to be detected, determines a moving direction of the detecting device, and sends a corresponding control instruction to the controller of the electric-cylinder. The controller controls the electric-cylinder to operate, such that the telescopic guide rod is moved to adjust a position of the connecting plate, thereby adapting to a detecting requirement of the vehicle to be detected.

When the vehicle to be detected is detected, the structured light device emits a light beam to the vehicle to be detected, and the industrial camera matched with the structured light device shoots an image having the light beam and processes the image having the light beam, so as to obtain three-dimensional information of the image.

In the embodiment, the rail vehicle clearance detecting system may include multiple detecting devices, which are arranged uniformly on the cross beam and the upright columns. Preferably, the number of the detecting devices may be 13. Industrial cameras of the multiple detecting devices send the obtained three-dimensional information of the images to the PC, and the PC superimposes the three-dimensional information of the images so as to obtain sectional contour data of the vehicle to be detected, and performs point cloud registration for the sectional contour data.

In another embodiment of the present application, the cross beam of the rail vehicle clearance detecting system includes a first cross beam and a second cross beam, and the first cross beam and the second cross beam are connected to each other via a key and two set of bolts. Further, the upright columns, the cross beams and the inclined supports are each manufactured by steel plate welding process, and are connected via a bolt to form the detecting rack. A stiffened plate is provided in welded components to reinforce rigidity of parts, and an aging treatment is performed on the welded components to stabilize sizes of the welded components.

When the detecting rack is built up, the two upright columns are adjusted to have a same height by adjusting iron pads, and a relative position relationship of the upright columns and the cross beam is adjusted by the adjusting block.

In order to improve an anti-overturning capability of the detecting rack, two inclined supports 109 are provided at a side of the detecting rack, as shown in FIG. 2.

As shown in FIG. 1, a cabling channel 110 is provided on one side of each of the two upright columns 102. Control wires of the rail vehicle clearance detecting system are arranged within the cabling channel 110, and are connected to an external device via the cabling channel 110.

In another embodiment of the present application, the PC is further configured to filter out invalid data in the sectional contour data before performing point cloud registration for the sectional contour data.

Preferably, that the PC is configured to filter out the invalid data in the sectional contour data may include that the PC is configured to filter out noise data in the sectional contour data.

When the contour of a vehicle to be detected is detected, noise points are definitely involved. The noise points may be classified into two types based on the forming reasons. One type is glitch noise, i.e., random noise, which is mainly caused by a quantization effect of the industrial camera. The other type is strong interference noise, i.e., pulse noise, which is mainly caused by mismatch and specular reflection. The strong interference noise adding in surface data will seriously affect edge detecting and feature extraction of a curved surface, and accuracy of a finally reconstructed curved surface, thus the noise data should be filtered out.

Generally, the PC filters out the glitch noise by a smooth filter method.

In another embodiment of the present application, that the PC is configured to perform point cloud registration for the sectional contour data may include that the PC is configured to compare the sectional contour data with rail vehicle contour reference data pre-stored in the PC.

Preferably, the PC is further configured to display a comparison result in a three-dimensional visualization manner and protect the sectional contour data after comparing the sectional contour data with the rail vehicle contour reference data pre-stored in the PC.

According to another embodiment of the present application, a rail vehicle clearance detecting system is provided, which further includes a laser rangefinder besides a detecting rack with a gantry structure, a detecting device and a PC.

The laser rangefinder is arranged at a side of the rail vehicle clearance detecting system for detecting a position of the rail vehicle in a moving direction of the vehicle so as to obtain position information and send the position information to the PC.

Specifically, when the vehicle to be detected moves to the detecting rack of the rail vehicle clearance detecting system, the laser rangefinder detects the position of the vehicle to be detected in a real time manner so as to obtain the position information, and sends the position information to the PC. The PC determines a current position of the vehicle to be detected based on the position information. When it is determined that the vehicle to be detected reaches the detecting rack, the PC sends a control instruction to start detecting.

Finally, it should be noted that, in the rail vehicle clearance detecting system according to the embodiments of the present application, the PC may be an industrial personal computer.

Various embodiments in the specification are described in a progressive way, each embodiment lays emphasis on difference from other embodiments, and the same or similar parts between various embodiments may be referred to each other.

The illustration of the disclosed embodiments can enable those skilled in the art to implement or practice the present application. Many changes to these embodiments are apparent for those skilled in the art, and general principles defined herein may be implemented in other embodiments without departing from spirit or range of the present application. Hence, the present application is not limited to these embodiments disclosed herein, but is to conform to the widest scope in accordance with principles and novel features disclosed herein.

The invention claimed is:

1. A rail vehicle clearance detecting system, comprising:
    a cross beam;
    an upright column connected to two ends of the cross beam via an adjusting block;
    an inclined support connected to the cross beam and the upright column for supporting the cross beam and the upright column;
    an electric-cylinder arranged on the upright column and the cross beam, wherein a telescopic guide rod is provided on a guide rail of the electric-cylinder and the telescopic guide rod is movable along the guide rail of the electric-cylinder under the movement of the electric-cylinder;
    a connecting plate fixed at an end of the telescopic guide rod, wherein a structured light device is provided at one end of the connecting plate and an industrial camera is provided at the other end of the connecting plate, and the industrial camera is used for detecting the contour of the rail vehicle to obtain three-dimensional information of an image of the rail vehicle; and
    a PC connected to a controller of the electric-cylinder, wherein the PC is configured to control the electric-cylinder to operate, receive the three-dimensional information of the image of the rail vehicle sent by the industrial camera, process the three-dimensional information of the images of the rail vehicle to obtain sectional contour data of the rail vehicle, and perform point cloud registration for the sectional contour data.

2. The rail vehicle clearance detecting system according to claim 1, wherein the cross beam comprises a first cross beam and a second cross beam connected to each other via a key.

3. The rail vehicle clearance detecting system according to claim 1, wherein the PC is further configured to filter out invalid data in the sectional contour data before performing the point cloud registration for the sectional contour data.

4. The rail vehicle clearance detecting system according to claim 3, wherein that the PC is configured to filter out the invalid data in the sectional contour data comprises that the PC is configured to filter out noise data in the sectional contour data.

5. The rail vehicle clearance detecting system according to claim 1, wherein that the PC is configured to perform point cloud registration for the sectional contour data comprises that the PC is configured to compare the sectional contour data with rail vehicle contour reference data pre-stored in the PC.

6. The rail vehicle clearance detecting system according to claim 5, wherein the PC is further configured to display a comparison result in a three-dimensional visualization manner and protect the sectional contour data after comparing the sectional contour data with the rail vehicle contour reference data pre-stored in the PC.

7. The rail vehicle clearance detecting system according to claim 1, further comprising:
    a laser rangefinder arranged at a side of the rail vehicle clearance detecting system, wherein the laser rangefinder is used for detecting a position of the rail vehicle in a moving direction of the vehicle to obtain position information and send the position information to the PC.

8. The rail vehicle clearance detecting system according to claim 1, wherein the PC is an industrial personal computer.

* * * * *